Patented Jan. 10, 1928.

1,656,119

UNITED STATES PATENT OFFICE.

JAN GERARD JURLING, OF THE HAGUE, NETHERLANDS, ASSIGNOR TO FABRIEK VAN CHEMISCHE PRODUCTEN, OF SCHIEDAM, NETHERLANDS, A DUTCH COMPANY.

METHOD OF MAKING AND SPINNING DERIVATIVES OF CELLULOSE AND FORMIC ACID.

No Drawing. Application filed May 29, 1926, Serial No. 112,691, and in the Netherlands June 4, 1925.

It is known that cellulose formate can be made from cellulose and formic acid with the aid of a catalyst, but it has not hitherto been possible to obtain this body of constant composition and of such qualities as to make it fit for the manufacture of artificial silk.

According to the invention a formate silk is made by using a new kind of cellulose formate which is perfectly stable and can be obtained of constant composition. The formic acid content may be increased to a higher degree than hitherto known, and can be controlled in a simple way. In this manner it is possible to manufacture an artificial silk having mechanical properties far exceeding those of all known kinds of artificial silk, for instance, it has an extraordinary tensile strength, particularly in wet state. According to the invention it is further possible to modify the formic acid content and the properties of the product by an after-treatment.

The new artificial silk may be spun directly from a primary solution, such as the solution resulting from the manufacture of the new cellulose formate, without first isolating the latter. It is also possible to prepare a spinning solution by redissolving the new cellulose formate, for instance, formate silk prepared therefrom but having faulty qualities, in a more or less concentrated formic acid, or in any other suitable solvent, with or without a catalyst.

The new cellulose formate may be produced by treating cellulose with formic acid of high percentage strength in the presence of a catalyst at a temperature not exceeding 5° C., that is to say, at lower temperatures than have been proposed before. Preferably the temperature should not substantially exceed 0° C. and most preferably the principal reaction is carried out at a temperature below 0° C.

As parent cellulose there may be used cotton cellulose, wood cellulose, cellulose in the form of waste artificial silk, etc.; the cellulose may or may not have been previously purified and may be in the form of cellulose or hydrocellulose obtainable by separation from a solution of cellulose or of a compound thereof, such as the cellulose or hydrocellulose which may be regenerated from a cellulose xanthate (viscose) or from a cuprammonium solution of cellulose, or from a solution of cellulose in a strong mineral acid or in a solution of a salt; there may also be used a cellulose which has been mercerized. Also derivatives of cellulose may be used as parent material. The cellulose may be used in air-dry condition (containing about 6 per cent of moisture) or after drying by artificial means. When using waste artificial silk, for instance, waste acetate silk, this is converted by the treatment into the new cellulose formate. As catalysts, substances such as $PCl_3$, $PCl_5$, $POCl_3$, $SO_2Cl_2$, $SO_3HCl$, $HCl$ and $H_2SO_4$, may be used. Catalysts which at the same time bind water have some advantage. Generally speaking, a mineral acid, or a halide of such an acid, or a mineral salt having an acid reaction, or a mixture of an acid and a salt is suitable as a catalyst. As further examples there may be mentioned zinc chloride, aluminium chloride, antimony trichloride, or mixtures of hydrochloric acid, with calcium chloride, with magnesium chloride, with aluminium chloride, with antimony trichloride and especially with zinc chloride. As already stated, the temperature required to obtain the new kind of cellulose formate does not exceed 5° C.; preferably a temperature of about 0° C. or lower is used.

For the manufacture of cellulose formate according to the invention, cellulose is mixed with an excess of highly concentrated formic acid and a catalyst, whilst ensuring that the temperature remains about 0° C. or lower, at least well below 5° C. It is essential that the formic acid be highly concentrated and most preferably it is as concentrated as possible. An excess is used sufficient to produce a viscous solution which is suitable for spinning. Such a solution is stable even at ordinary temperature, if the catalyst is made inactive. The solution of the cellulose requires a considerable time, depending on the nature of the primary material, the quantity and the nature of the catalyst, and the temperature. Generally the solution occupies more than 24 hours and in most cases more than 40 hours, but the period can be diminished by increasing the quantity of the catalyst.

As mentioned above, catalysts which at the same time bind water have some advantage. This is owing to the fact that the presence of water may have a detrimental effect on the quality of the cellulose formate produced and may prevent the formation of the tri-formate. In any case it is necessary to use a highly concentrated formic acid to obtain the best results.

Mixed esters can be obtained by dissolving other cellulose esters, for example, cellulose acetate, in the solution of cellulose formate and precipitating the esters together.

Another method of obtaining such mixed products is to treat finished cellulose formate with acetyl chloride or acetic anhydride and a catalyst. In the same way cellulose formate of insufficient formic acid content may again be treated at a low temperature with highly concentrated formic acid and a catalyst. In the latter case, of course, the product is not a mixed ester, but a more highly formylated product.

The freshly prepared solution may be spun directly; to render it stable, however, the catalyst should be made inactive. If the catalyst is an acid, an acid halide or the like, it may be made inactive by neutralization with a base or with the salt of a weak acid, such as sodium formate, ammonium formate or calcium formate. When the catalyst is hydrochloric acid, it may be removed to a considerable extent by evaporation in a vacuum or by passing a current of dry air through the solution.

When bases or salts are added to the freshly prepared solution for the purpose of neutralizing the catalyst, there are formed in many cases insoluble salts which are very finely suspended in the solution. These finely divided suspended salts, which are not removed by filtration, appear to have a beneficial effect, so that in many cases it is preferable to add a greater quantity of the salt than is required for rendering the catalyst inactive. This is especially important when very fine filaments are to be spun through comparatively large apertures, either when bobbins are used or centrifugal boxes.

The solution of cellulose formate in formic acid may also be used for other purposes than the manufacture of artificial silk. Thus it may be treated directly to obtain formed objects composed of cellulose formate, either by coagulating the solution in a coagulating bath or by evaporating the formic acid. It is also possible to separate the cellulose formate as a precipitate without giving it any special shape, and it may be used for any desired purpose.

Especially important, however, is the spinning of the solution of cellulose formate to obtain artificial silk, artificial straw, bands, ribbons and the like. The spinning of artificial silk is carried out in the usual manner by ejecting the solution through small apertures into a coagulating bath and winding up the coagulated thread. For this purpose bobbins may be used, and also centrifugal boxes. Many organic and inorganic liquids may be used for the coagulating bath; when an organic liquid is used, it may or may not be one which is miscible with water. The most important liquids are water, or aqueous solutions such as salt solutions. A solution of a formate is very suitable since the formate may be produced from the formic acid liberated during the spinning, by partial or complete neutralization, for instance by the addition of soda or lime. The bath may be kept neutral or acid. Also alkaline baths may be used, but then it should be taken into account that alkaline baths have a more or less saponifying action on the cellulose formate. If a formate bath is used the concentration of formate, or formic acid, may be kept constant by a controlled addition of a base and a discharge of formate solution. The formic acid may be recovered from the formate solution in known manner. For spinning artificial straw, bands, ribbons or other objects the method is analogous.

The freshly spun artificial silk may be treated by any of the subsidiary operations usual in the treatment of viscose silk, such as treatment with solutions of different metallic salts, stretching, twisting, reeling, dyeing, steaming, washing, or bleaching. After washing, bleaching and drying in stretched condition a very strong formate silk is obtained which has a beautiful lustre, is waterproof in a very high degree, and has a high percentage of formic acid.

The content of formic acid in the product is dependent upon the conditions of the reaction. Particularly upon the concentration of the formic acid, the nature and the amount of the catalyst, the duration of reaction and so on. A formic acid content of above 50 per cent or even higher, can be obtained without difficulty, but the invention is not limited to any fixed percentage of formic acid in the product.

It has further been found that the percentage of formic acid and the quality of the formate silk can be modified by a treatment with an alkali or an alkaline salt, particularly with a caustic alkali, without any detrimental effect on the lustre of the product, which resembles that of natural silk. When formate silk is allowed to stand in a bath of dilute caustic alkali, the formic acid content of the silk decreases conformably with the content of alkali hydroxide in the bath, which may be neutralized almost completely by this action. In this way the percentage of formic acid in the final product can easily be controlled and fixed at a definite value. By this partial saponification, silks are obtained of different permeability for water and of different behavior in dye-baths.

The high tensile strength, particularly in wet condition, of these partly saponified products as well as of the original silk is most remarkable. It has been possible to obtain a product with a tensile strength in dry condition of more than 15,000 metres and in wet condition of over 10,000 metres (these figures representing the length of filament causing rupture by its own weight).

The following examples illustrate the invention:—

*Example 1.*—50 kilos of dried wood cellulose are treated at 0° C. with 520 kilos of a liquid containing 95 per cent of anhydrous formic acid and 4.5 per cent of $SO_2Cl_2$. After 48 hours a clear viscous solution is obtained to which are added, whilst continuously stirring, 80 kilos of sodium formate and sufficient formic acid to produce a solution of a desired viscosity. After filtering, this solution is spun in an aqueous spinning bath with a centrifugal spinning machine to obtain artificial silk.

*Example 2.*—50 parts by weight of purified cellulose are treated with 700 parts by weight of formic acid of 98–100 per cent strength, 35 parts by weight of hydrogen chloride and 35 parts by weight of zinc chloride for 16 hours at a temperature of about minus 10° C. The cellulose formate obtained contains 51.7 per cent of formic acid.

Though the cellulose formate has valuable properties, difficulties are encountered in dyeing the material, particularly in the case of artificial silk made from the new cellulose formate. These difficulties are of the same nature as those encountered in dyeing acetate silk, and are due to the low capacity of the material for absorbing dyestuffs.

It has been found that materials consisting of or containing the new cellulose formate can be dyed by means of any of the processes known for dyeing cellulose acetate silk. Thus the formate silk may be wholly or partly saponified before dyeing. The dyestuffs which dye cellulose acetate directly may also be used to dye cellulose formate directly. Other known methods for dyeing cellulose acetate comprise a treatment with a liquid which causes the fibre to swell, so that it absorbs dyestuffs more readily. The same treatment may be applied to formate silk, and is especially effective for dyeing mixed esters of cellulose formate and acetate. Thus, for instance, a freshly spun filament of mixed cellulose formate and acetate may be treated with an organic liquid such as acetone and then dyed with the most various kinds of dyestuffs.

*Example 3.*—50 kilos of purified dry cellulose are treated at —5° C. with 1000 kilos of formic acid of 98–100 per cent strength and 50 kilos of dry hydrogen chloride. After 42 hours the catalyst is made inactive by the addition of an equivalent quantity of anhydrous sodium formate. A solution of 3.5 kilos of cellulose acetate in just the required amount of formic acid is then well stirred with the cellulose formate solution so obtained. The mixture is filtered and spun, and the artificial silk obtained is washed and dried as usual. After drying, the silk is left for 24 hours in a bath containing a dilute solution of sodium hydroxide whose content of sodium hydroxide is 3 per cent of the weight of the silk.

After washing and drying, an artificial silk is obtained which can be dyed easily by all dyestuffs which dye partly saponified cellulose acetate silk.

What I claim is:—

1. A process for the manufacture of artificial coagulated material, comprising the steps of treating cellulose with strong formic acid and a catalyst at a temperature not exceeding 5° C. until a solution of cellulose formate is obtained, rendering the catalyst inactive, and spinning the solution in a coagulating bath.

2. Process according to claim 1 in which the coagulating bath is an aqueous bath.

3. A process for the manufacture of artificial coagulated material, comprising the steps of treating cellulose with strong formic acid and a catalyst at a temperature not exceeding 5° C. until a solution of cellulose formate is obtained, rendering the catalyst inactive, and spinning the solution in a coagulating bath containing an aqueous solution of a salt of formic acid.

4. A process for the manufacture of artificial coagulating material, comprising the steps of treating cellulose with strong formic acid and a catalyst at a temperature not exceeding 5° C. until a solution of cellulose formate is obtained, rendering the catalyst inactive, spinning the solution in a coagulating bath, washing the product, and subjecting it to a treatment with a diluted alkali.

5. A process for the manufacture of artificial coagulated material, comprising the steps of treating cellulose with strong formic acid and a catalyst at a temperature not exceeding 5° C. until a solution of cellulose formate is obtained, rendering the catalyst inactive, spinning the solution in a coagulating bath, washing the product, and subjecting it to a treatment with a liquid which renders it more absorbent for dyestuffs, and then dyeing it.

6. A process for the manufacture of artificial coagulated material, comprising the steps of treating cellulose with strong formic acid and a catalyst at a temperature not exceeding 5° C. until a solution of cellulose formate is obtained, rendering the catalyst inactive, adding a solution of cellulose acetate, and spinning the mixed solution in a coagulating bath.

7. A process for the manufacture of artificial coagulated material, comprising the steps of treating cellulose with strong formic acid and a catalyst at a temperature not exceeding 5° C. until a solution of cellulose formate is obtained, rendering the catalyst inactive, adding a solution of cellulose acetate, spinning the mixed product in a coagulating bath, washing it, and subjecting it to a treatment with a diluted alkali.

8. A process for the manufacture of artificial coagulated material, comprising the steps of treating cellulose with strong formic acid and a catalyst at a temperature not exceeding 5° C. until a solution of cellulose formate is obtained, rending the catalyst inactive, adding a solution of cellulose acetate, spinning the mixed product in a coagulating bath, washing it, and subjecting it to a treatment with a liquid which renders it more absorbent for dyestuffs and dyes.

9. A process for the manufacture of artificial coagulated material, comprising the steps of treating cellulose with strong formic acid and a catalyst at a temperture not exceeding 5° C., and separating the formed cellulose formate from its solvent.

10. A process for the manufacture of artificial coagulated material, comprising the steps of treating cellulose with strong formic acid and a catalyst at a temperature not substantially exceeding 0° C., and separating the formed cellulose formate from its solvent.

11. A process according to claim 10, in which a catalyst is used which is capable of binding water.

12. A process for the manufacture of artificial coagulated material, comprising the steps of treating cellulose with strong formic acid, hydrogen chloride and zinc chloride at a temperature not exceeding 5° C., and separating the formed cellulose formate from its solvent.

13. A process for the manufacture of artificial coagulated material, comprising the steps of treating cellulose with strong formic acid, hydrogen chloride and zinc chloride at a temperature not substantially exceeding 0° C., and separating the formed cellulose formate from its solvent.

14. A process for the manufacture of artificial coagulated material, comprising the steps of treating cellulose with strong formic acid and a catalyst at a temperature not exceeding 5° C., dissolving a cellulose ester in the reaction product, and separating the formed cellulose formate from its solvent.

15. A process according to claim 14, in which the cellulose ester dissolved in the reaction product is cellulose acetate.

16. A process for the manufacture of artificial coagulated material, comprising the steps of subjecting a cellulose to a treatment tending to faciliate its solubility without substantially affecting the chemical configuration of the cellulose molecule, treating the resultant product with strong formic acid and a catalyst at a temperature not exceeding 5° C., and separating the formed cellulose formate from its solvent.

17. A process according to claim 16, in which the cellulose used has been regenerated from a solution.

18. A process for the manufacture of artificial coagulated material, comprising the steps of treating cellulose with strong formic acid and a catalyst at a temperture not exceeding 0° C. until a solution of cellulose formate is obtained, rendering the catalyst inactive, and spinning the solution in a coagulating bath.

19. A process for the manufacture of artificial silk, comprising the steps of treating cellulose with strong formic acid, hydrogen chloride and zinc chloride at a temperature not substantially exceeding 0° C. until a solution of cellulose formate is obtained, rendering the hydrogen chloride inactive, and spinning the solution in an aqueous coagulating bath.

In testimony whereof I affix my signature.

JAN GERARD JURLING.